Figure 1:
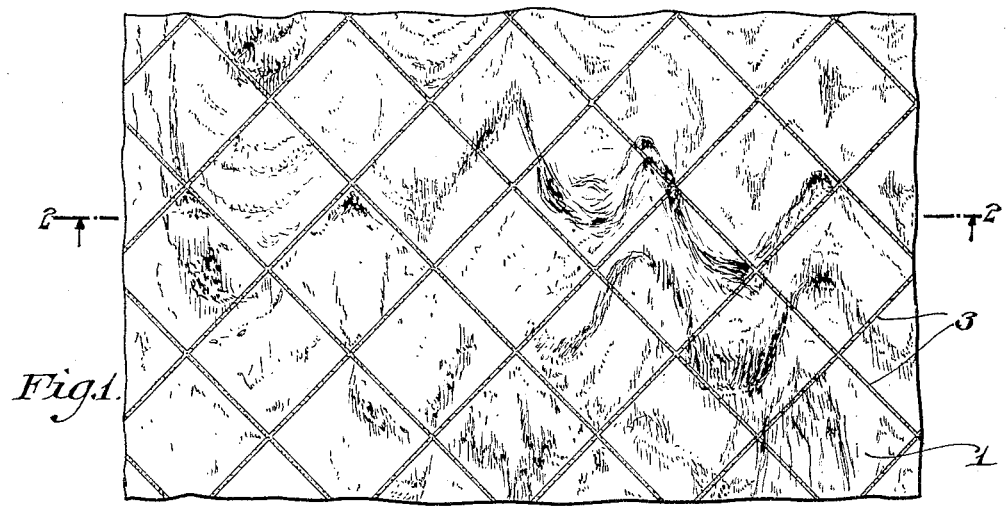

Feb. 14, 1933.  W. E. WHITNEY  1,897,458
MANUFACTURE OF LINOLEUM
Filed April 19, 1929

Inventor
William E. Whitney
By Attorney

Patented Feb. 14, 1933

1,897,458

REISSUED

UNITED STATES PATENT OFFICE

WILLIAM E. WHITNEY, OF PHILADELPHIA, PENNSYLVANIA, ASSIGNOR, BY MESNE ASSIGNMENTS, TO SLOANE-BLABON CORPORATION, OF NEW YORK, N. Y., A CORPORATION OF DELAWARE

MANUFACTURE OF LINOLEUM

Application filed April 19, 1929. Serial No. 356,519.

My invention is an improved article of manufacture resulting from the decoration of a linoleum sheet by cutting the surface thereof and compacting in the cut or cuts a suitable filler to outline a pattern or design, and the method of forming such product.

Heretofore it has been deemed impracticable to make inlaid linoleum of either the straight line or moulded variety with pattern outlines less than about one-quarter inch wide because straight line tesserae of less width are too fragile for handling and granulated linoleum composition cannot be successfully deposited through narrower template slots between the plaques of granulated linoleum composition and retain their identity when the sheet is compacted.

By my improvements, pattern outlines, preferably from three-sixteenths of an inch downward to the minimum thickness of a cutting edge, may be formed extending through the entire thickness of the linoleum sheet preferably after the initial compacting thereof by the pressure of a heated hydraulic press or calender; the outlines having such configuration as will closely simulate laid tile, terrazzo or cloissonne.

My improvements are applicable primarily to the decoration of sheeted linoleum having a plain, striated, marbleized, jaspe or moire surface by forming outline designs thereon, but are also applicable to straight line or moulded inlaid linoleum to supplement or refine the pattern thereof, or provide a secondary decorative design thereon.

The cuts may be formed in the linoleum sheet by one or more cutters movable normal to the surface and, if desired, shaped to the contour of the pattern to be produced, or by one or more cutters or knives movable over the surface of the linoleum sheet and severing it by a slicing or shearing action.

The cuts penetrate to the bottom of the linoleum sheet and the displaced material forms ridges projecting above the normal surface of the material with narrow grooves or channels between them greater in depth than the thickness of the linoleum sheet. A filler, preferably consisting of powdered linoleum with suitable pigments combined therewith, is sifted over the surface of the sheet and fills the grooves. After filling the grooves with powder, it is preferable to press the powdered linoleum in the grooves sufficiently hard so that it is not displaced when the superfluous filler is brushed off. After such compacting, surplus filler may be brushed off. The ridges held retain the material in the grooves during brushing and retain therein sufficient filler to fill the grooves with compacted material when the sheet is pressed to compact the filler and depress the ridges flush with the sheet surface.

The characteristic features of my improvements will further appear from the following description and the accompanying drawing of an illustrative embodiment thereof.

Figure 2:
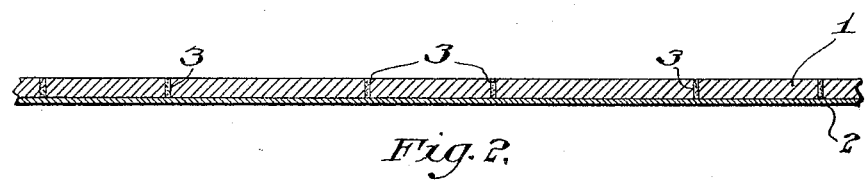
Figure 3:
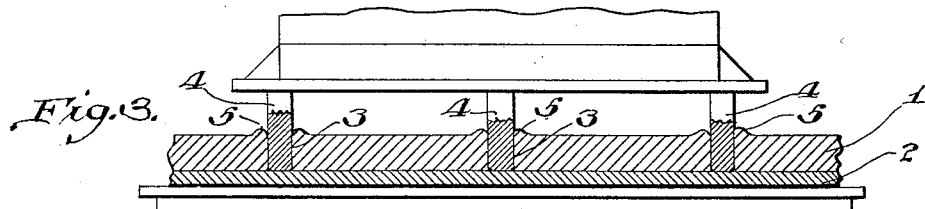
Figure 4:
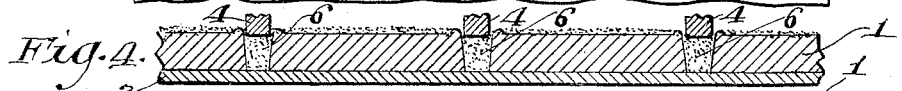
Figure 5:
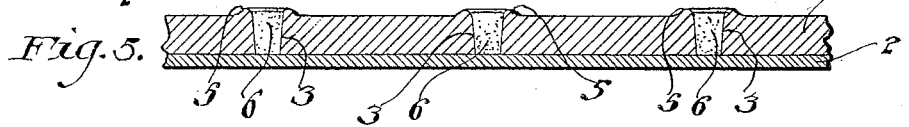
Figure 6:
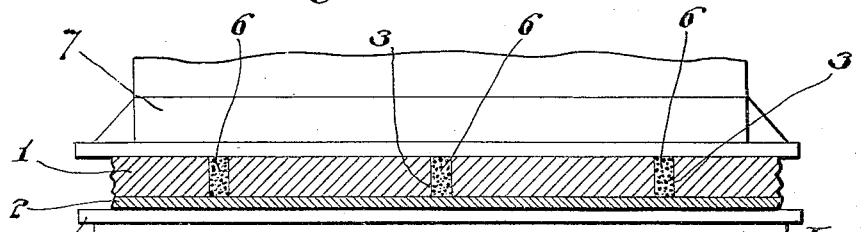

In the drawing, Fig. 1 is a top plan view of a section of linoleum covering decorated in accordance with my invention; Fig. 2 is a transverse sectional view thereof; Fig. 3 is an exaggerated diagrammatic view illustrating the cutting of a linoleum sheet which has been compacted by the pressure of a heated press; Fig. 4 is an exaggerated diagrammatic view illustrating the preliminary compacting of the filler; Fig. 5 is an exaggerated diagrammatic view of the cut sheet after surplus filler has been swept therefrom; and Fig. 6 is an exaggerated diagrammatic view illustrating the final compacting of the sheet and filler and the pressing down of the ridges along the edges of the cuts.

As illustrated in the drawing, the linoleum coating 1 is united to the backing fabric 2, such as burlap or felt, in any usual manner. The linoleum layer 1 may consist of linoleum composition pressed upon the backing in a unitary sheet, or may consist of tesserae cut from sheeted linoleum composition and assembled and united on the backing, or may consist of plaques of granulated linoleum composition deposited upon the backing through suitable template apertures and united thereto and to one another, by the pressure of a suitable heated press.

The linoleum sheet 1, while in an uncured and relatively soft and tacky condition, but preferably forming a homogeneous sheet, sufficiently compacted by heat and pressure to prevent blurring of cut pattern lines by the necessary subsequent treatment, has cuts 3 formed therein in a suitable pattern by one or more cutters 4. The blade of the cutter is preferably thin so as to readily penetrate to the bottom of the linoleum sheet and its edge is comparatively blunt so as not to cut the burlap or felt backing. The cuts may be as narrow as desired and are preferably of uniform width throughout their depths and less than three-sixteenths ($\frac{3}{16}''$) of an inch in width, and the material displaced by the cuts forms ridges or lips 5 having between them channels of greater depth than the thickness of the linoleum sheet.

A filler, preferably consisting of powdered linoleum composition mixed with suitable pigments, is spread over the surface of the sheet 1 so as to fill the channels between the ridges 5. After the channels are filled with powder, it is preferable to lightly compact the powder by pressing the same by the cutters 4 or a supplementary compacting tool. The excess filler is then brushed from the surface of the sheet 1. The ridges 5 help prevent the filler in the cuts 3 from being brushed out, and there is left in such cuts a suitable volume of powdered linoleum filler to form a compacted insert the full depth of the sheet 1. If desired, a powdered metal, such as bronze or aluminum may be mixed with the filler powder 6 so as to give the effect of metal ribs separating the tile-like tesseræ formed by the design.

To further compact the filler 6, unite it with the sheet 1, and lay the ridges 5 flush with the sheet 1, the composite fabric is subjected to heavy pressure and heat by suitable apparatus, such as the platen and reciprocating head of a usual heated finishing press 7, and is then cured in heated storage chambers.

Having described my invention, I claim:

1. The method of decorating linoleum which comprises moving a cutter through a linoleum sheet having a fibrous backing to form a cut substantially down to said backing and having ridged edges, filling such cut with linoleum, and pressing such ridged edges substantially flush with the surface of said sheet and securing said filling.

2. The method of decorating linoleum having a fibrous backing which comprises moving a cutter through a linoleum sheet to form cuts therein down to said backing, filling said cuts with linoleum, compacting said filler, removing excess filler from said linoleum, and pressing said linoleum and filler.

3. The method of decorating linoleum which comprises compacting granular linoleum composition upon a fabric backing by heat and pressure, cutting through said compacted linoleum to a depth greater than the width of the cuts to form a knife edge pattern outline, spreading a filling powder over the cut surface and compacting such powder in said cuts, brushing surplus powder from said linoleum surface, and pressing the sheet to further compact the filler in said cuts and depress ridges formed thereby flush with the sheet surface.

In testimony whereof I have hereunto set my name this 15th day of April 1929.

WILLIAM E. WHITNEY.